United States Patent
Little

(10) Patent No.: US 9,055,065 B2
(45) Date of Patent: Jun. 9, 2015

(54) MANAGING PARTICIPANT ORDER IN DISTRIBUTED TRANSACTIONS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 97 days.

(21) Appl. No.: 13/301,695

(22) Filed: Nov. 21, 2011

(65) Prior Publication Data

US 2013/0132458 A1    May 23, 2013

(51) Int. Cl.
| | |
|---|---|
| G06F 15/16 | (2006.01) |
| G06F 17/00 | (2006.01) |
| G06F 11/00 | (2006.01) |
| H04L 29/08 | (2006.01) |
| G06F 17/30 | (2006.01) |
| G06F 9/46 | (2006.01) |

(52) U.S. Cl.
CPC ............ *H04L 67/10* (2013.01); *G06F 2201/87* (2013.01); *G06F 17/30227* (2013.01); *G06F 9/466* (2013.01)

(58) Field of Classification Search
CPC ... H04L 5/0035; H04L 12/241; H04L 41/042; G06F 17/3008; G06F 9/466; G06F 17/30227
USPC ........ 709/230, 201, 205; 714/148, 15, 16, 19, 714/48; 707/703
See application file for complete search history.

(56) References Cited

U.S. PATENT DOCUMENTS

| | | | |
|---|---|---|---|
| 5,335,343 A * | 8/1994 | Lampson et al. ................ 714/19 |
| 5,504,899 A * | 4/1996 | Raz ....................................... 1/1 |
| 5,522,070 A * | 5/1996 | Sumimoto ..................... 718/104 |
| 6,012,094 A * | 1/2000 | Leymann et al. ............. 709/230 |
| 7,469,256 B1 * | 12/2008 | Manolov et al. ...................... 1/1 |
| 2002/0023129 A1 * | 2/2002 | Hsiao et al. .................... 709/205 |
| 2006/0064690 A1 * | 3/2006 | Hamadi et al. ................ 718/100 |
| 2006/0123128 A1 * | 6/2006 | Feingold et al. .............. 709/230 |
| 2006/0143186 A1 * | 6/2006 | Whyte ............................ 707/10 |
| 2006/0174224 A1 * | 8/2006 | Parkinson et al. ............. 717/120 |
| 2007/0174185 A1 * | 7/2007 | McGoveran ..................... 705/39 |
| 2007/0220059 A1 * | 9/2007 | Lu et al. ........................ 707/200 |
| 2008/0005538 A1 * | 1/2008 | Apparao et al. .............. 712/220 |
| 2008/0082569 A1 * | 4/2008 | Mansour et al. .............. 707/102 |
| 2009/0313525 A1 * | 12/2009 | Savin et al. ..................... 714/752 |
| 2011/0078516 A1 * | 3/2011 | El-Kersh et al. ................. 714/48 |
| 2011/0246822 A1 | 10/2011 | Little |
| 2012/0005530 A1 * | 1/2012 | Marathe et al. ................. 714/19 |
| 2012/0166889 A1 * | 6/2012 | El-Kersh et al. ................. 714/48 |

* cited by examiner

*Primary Examiner* — Aftab Nasir Khan
(74) *Attorney, Agent, or Firm* — Lowenstein Sandler LLP

(57) ABSTRACT

A coordinator running on a computing device identifies a plurality of participants for a distributed transaction, wherein the coordinator coordinates the distributed transaction. The coordinator determines a participant order for the plurality of participants based on one or more ordering rules. The coordinator sends a message to a first participant in the determined participant order. The coordinator then waits until a response is received from the first participant before sending the message to a second participant in the determined participant order.

20 Claims, 6 Drawing Sheets

MANAGING PARTICIPANT ORDER IN DISTRIBUTED TRANSACTIONS

TECHNICAL FIELD

Embodiments of the present invention relate to distributed transactions, and more specifically to improving efficiency of distributed transactions based on managing the invocation order of participants.

BACKGROUND

Distributed transactions are often performed on distributed computing systems. A distributed transaction is a set of operations that update shared objects. Distributed transactions should satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property ensures that the transaction does not violate integrity constraints of the shared objects. The Isolation property ensures that intermediate effects of the transaction are not detectable to concurrent transactions. Finally, the Durability property ensures that changes to shared objects due to the transaction are permanent.

To ensure the Atomicity property, all participants of the distributed transaction coordinate their actions so that they either unanimously abort or unanimously commit to the transaction. A two-phase commit protocol is commonly used to ensure Atomicity. Under the two-phase commit protocol, the distributed system performs the commit operation in two phases. In the first phase, commonly known as the prepare phase or request phase, a coordinator (a node in the distributed computing system managing the transaction) asks all participants (nodes in the distributed computing system participating in the transaction) whether they are able to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

In conventional transaction systems, there is no mechanism for controlling an order in which participants are invoked. Nor is there a mechanism for determining an optimal ordering for participants.

BRIEF DESCRIPTION OF THE DRAWINGS

The present invention is illustrated by way of example, and not by way of limitation, in the figures of the accompanying drawings and in which.

DETAILED DESCRIPTION

Figure 1:
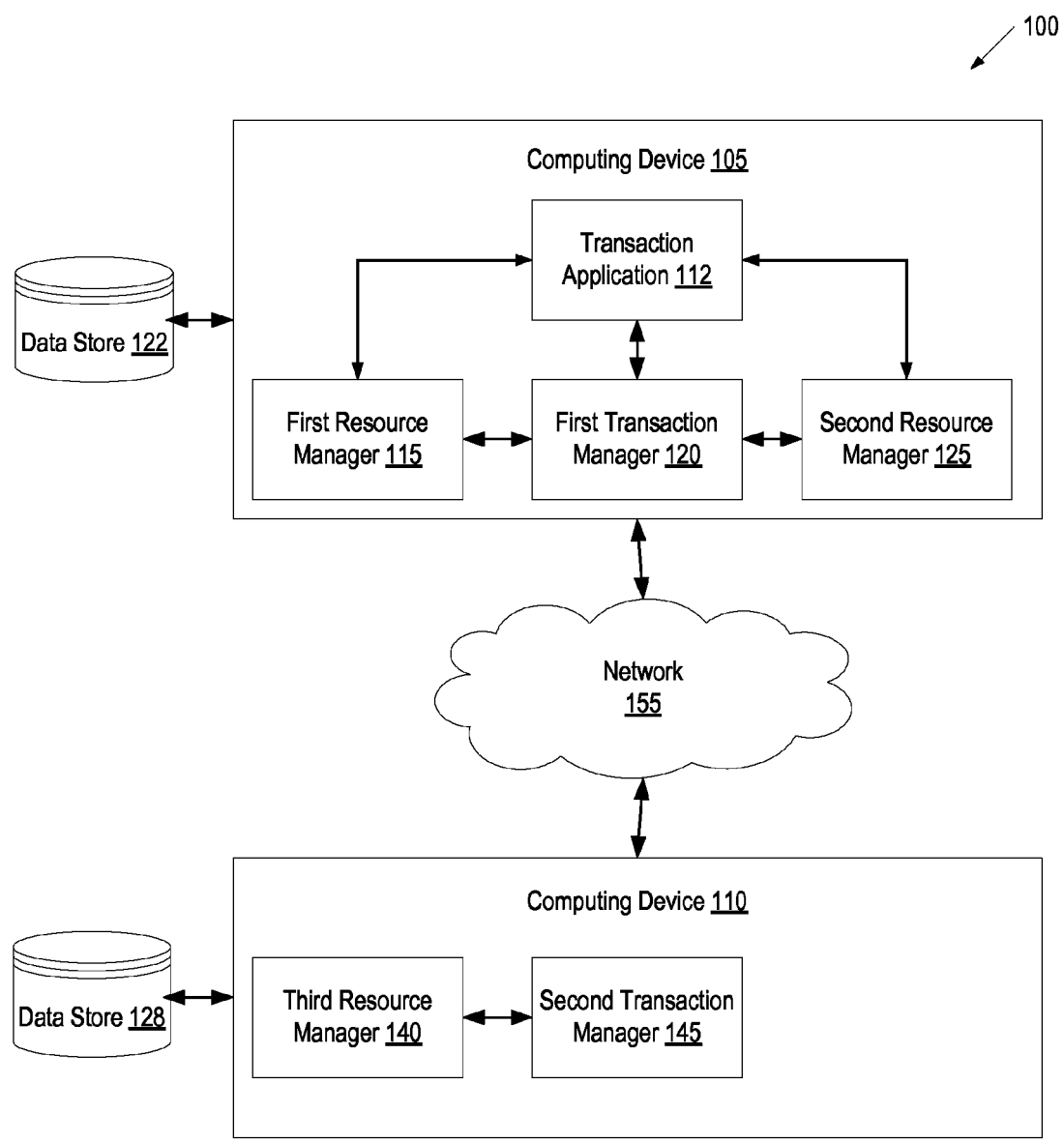
FIG. 1 illustrates an exemplary distributed computing system, in which embodiments of the present invention may operate.

Described herein is a method and apparatus for performing distributed transactions. In one embodiment, a coordinator running on a computing device identifies participants for a distributed transaction, wherein the coordinator coordinates the distributed transaction. The coordinator determines a participant order for the participants based on one or more ordering rules. The ordering rules may cause the participants to be ordered based on reliability ratings associated with the participants, based on dependencies between the participants, based on performance metrics associated with the participants, and/or based on other criteria. The coordinator sends a message to a first participant in the determined participant order. The coordinator then waits until a response is received from the first participant before sending the message to a second participant in the determined participant order. In one embodiment, in which the distributed transaction is a two-phase commit distributed transaction, the coordinator determines a first participant order to use during a prepare phase of the distributed transaction and a second participant order to use during a commit phase of the distributed transaction.

Embodiments of the present invention enable a transaction manager that acts as a coordinator for a distributed transaction to control a participant invocation order for the distributed transaction. By controlling the participant invocation order, the transaction manager can reduce system resource expenditures in instances where transactions are canceled or rolled back. For example, there may be no point in a first resource manager preparing for a transaction if a second resource manager on which the first resource manager depends has not yet prepared for the transaction. Embodiments of the present invention use such dependency information and/or additional information to order participant invocation. Additionally, the transaction manager can reduce the likelihood that a transaction will be canceled due to system failure of any of the participants by ordering less reliable participants in the front of the participant order.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "sending", "waiting", "determining", "ordering", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a computer-readable medium having stored thereon instructions, which may be used to program a computer system (or other electronic devices) to perform a process according to the present invention. A computer-readable medium includes any mechanism for storing information in a form readable by a machine (e.g., a computer). For example, a computer-readable medium includes a read only memory ("ROM"), random access memory ("RAM"), magnetic disk storage media, optical storage media, flash memory device, etc.

FIG. 1 illustrates an exemplary distributed computing system 100, in which embodiments of the present invention may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services.

In one embodiment, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple buses, each of which may logically interconnect different services and/or clients.

In one embodiment, the distributed computing system 100 includes multiple computing devices 105, 110 connected via a network 155, which may be a private network (e.g., a local area network (LAN), wide area network (WAN), etc.), a public network (e.g., the Internet), or a combination of a private network and a public network. Alternatively, the distributed computing system 100 may only include a single computing device and/or the computing devices 105, 110 may be directly connected to each other.

Each computing device 105, 110 may be a client computing device or a server computing device. Computing devices may be, for example, personal computers (PC), palm-sized computing devices, personal digital assistants (PDA), rack-mount servers, tablet computers, notebook computers, mobile phones, etc. Computing device 105 and computing device 110 may each be a single machine, or may include multiple interconnected machines (e.g., server machines configured in a cluster).

In one embodiment, computing devices 105, 110 are connected to data stores 122, 128. Data stores 122, 128 may include a file system, a database, or other data storage arrangement. Data stores 122, 128 may be internal to computing devices 105, 110, or external and connected to computing device 105, 110 either directly or via a network.

Computing device 105 and/or computing device 110 may host services, applications and/or other functionality that is available to other computing devices (e.g., to clients) on the distributed computing system 100. Alternatively, or in addition, computing devices 105, 110 may act as clients that access services provided by other computing devices. In one embodiment, the computing device 105 includes a first transaction manager 120, a first resource manager 115 and a second resource manager 125, and computing device 110 includes a second transaction manager 145 and a third resource manager 140.

A transaction manager is a software module that coordinates multiple participants during a distributed transaction. A participant may be another transaction manager or a local resource manager. For example, if first transaction manager 120 acts as coordinator for a distributed transaction, second transaction manager 145, first resource manager 115 and second resource manager 125 may be participants to the distributed transaction.

A resource manager is a software module that manages a storage system, which is typically a persistent and stable storage system. A resource manager may be an external system accessed by an application. A resource manager provides and enforces the ACID transaction properties for specific data and operations. Examples of resource managers include a relational database (which supports persistent storage of relational data), an executive information system (EIS), and the Java Message Service (JMS) provider (which manages transactional message delivery). Other examples of resource managers include other types of databases and file managers.

First transaction manager 120 and second transaction manager 145 may each act as master coordinators or intermediate coordinators to coordinate distributed transactions. Coordinating a distributed transaction includes determining whether each participant can commit to a transaction, directing each participant to commit if all are able, and directing each participant to rollback if not all participants are able to commit. A master coordinator is a transaction manager that acts on behalf of a process that initiates a distributed transaction (e.g., by initiating a commit operation) to coordinate participants of the distributed transaction. A master coordinator arrives at a commit or abort decision and propagates that decision to participants. An intermediate coordinator is a transaction manager that acts on behalf of a process that participates in a distributed transaction to coordinate local resource managers and/or additional transaction managers that are participants in the distributed transaction. An intermediate coordinator gathers information about the participants that it manages, and reports the information to a master coordinator. An intermediate coordinator also receives commit or abort decisions from a master coordinator, and propagates the decisions to participants that it manages.

In one embodiment, first transaction manager 120 acts as a master coordinator, and coordinates a distributed transaction between first resource manager 115, second resource manager 125 and second transaction manager 145. The first transaction manager 120 may establish a new transaction upon receiving a request from a transaction application 112 to perform the transaction. A transaction application 112 may be any application that requests that operations be performed transactionally or that otherwise causes distributed transactions to be initiated. The transaction application 112 may be collocated with the first transaction manager 120 (as shown), or may be located on a remote machine (e.g., on computing device 110).

First transaction manager 120 may initiate a two-phase commit distributed transaction and determine all participants for the distributed transaction. Once the participants are determined, first transaction manager 120 may determine an invocation order for the participants. The first transaction manager 120 may then invoke the participants (e.g., send prepare, commit and/or abort messages to the participants) in the determined invocation order. Transaction managers capable of selectively ordering participants of distributed transactions are discussed in greater detail below with reference to FIG. 2.

Returning to FIG. 1, first transaction manager 120 may also act as an intermediate coordinator, and coordinate a distributed transaction between only first resource manager 115 and second resource manager 125. Acting as an intermediate coordinator, first transaction manager 120 may determine an order for participants that it manages. Therefore, a master coordinator may determine a first participant order that governs an order in which the master coordinator invokes participants, and an intermediate coordinator (which is a participant invoked by the master coordinator) may determine a second participant order that governs an order in which the intermediate coordinator invokes additional participants.

Each resource manager that participates in a distributed transaction may be a participant of the transaction. During a prepare phase of a two-phase commit distributed transaction, a participant is asked via a prepare message whether it can commit to the transaction by a coordinator (e.g., an intermediate coordinator or a master coordinator). Upon receiving the prepare message, the participant performs an action or set of actions. Typically, the participant will generate a snapshot of its state before performing any additional operations to enable the participant to roll back to the current state if appropriate. The act of generating the snapshot and/or performing other operations may be resource intensive and require overhead. Additionally, the participant will typically generate locks to resources that will be used in the transaction. These resources may then be unavailable until the transaction completes. The locks will later be released when the transaction commits or rolls back.

If the resource manager can commit to the transaction, it sends a commit response to the coordinator. If the resource manager cannot commit to the transaction, it sends an abort message to the coordinator. Alternatively, if the resource manager will not undergo a state change from the distributed transaction, it can send a read-only response to the coordinator.

During a commit phase of a two-phase commit distributed transaction, each resource manager receives a commit command if all resource managers indicated that they were able to commit. In response to receiving a commit command, a resource manager will commit to the transaction, and will then release one or more locks to resources managed by the resource manager. If one or more of the participating resource managers sent an abort response, then all resource managers may receive an abort command during the commit phase. Resource managers that responded during the prepare phase with a read-only response may receive no commands during the commit phase.

Figure 2:
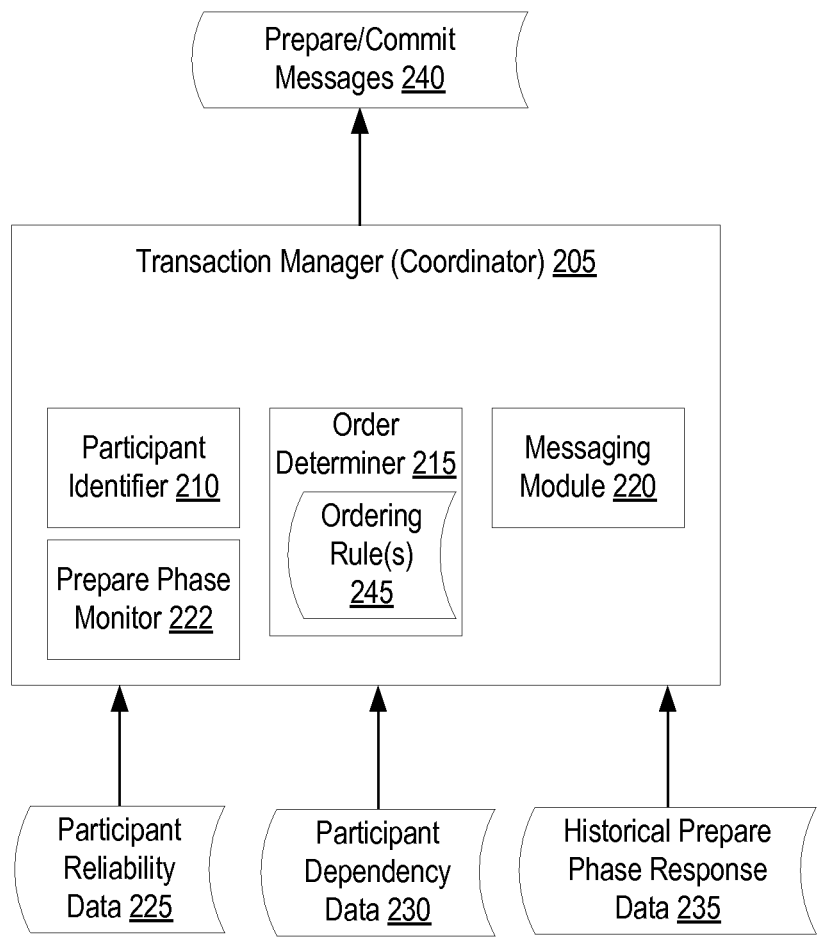
FIG. 2 illustrates a block diagram of a transaction manager that can control participant invocation order, in accordance with one embodiment of the present invention.

FIG. 2 is a block diagram illustrating a transaction manager 205 that can control participant invocation order, in accordance with one embodiment of the present invention. In one embodiment, the transaction manager 205 includes a participant identifier 120, an order determiner 215 and a messaging module 220. The transaction manager 205 may act as a coordinator for a distributed transaction. Accordingly, transaction manager 205 may initiate and manage a distributed transaction.

A transaction application invokes the transaction manager to coordinate a distributed transaction. Participant identifier 210 determines one or more resource managers that will participate in the distributed transaction. In one embodiment, participant identifier 210 receives identification of specific resource managers and/or types of resource managers that will participate in the transaction from the transaction application. Alternatively, or in addition, transaction manager 205 may automatically determine participants for the distributed transaction. Participants may be determined, for example, based on a type of transaction that will be performed. In one embodiment, transaction manager 205 accesses a service directory to identify appropriate resource managers to participate in a particular transaction.

Order determiner 215 determines an order in which to invoke the identified participants for the distributed transaction. Order determiner 215 may determine the order for the participants based on a single metric or based on a combination of metrics. These metrics may be based on various categories of historical data.

In one embodiment, order determiner 215 determines the participant order for a distributed transaction based on received participant reliability data 225. The participant reliability data 225 may be reported by each participant for a distributed transaction. Alternatively, one or more system monitors may monitor and record data on network interruptions, failure frequency, average bandwidth, average lag, and so on for some or all of the participants. Order determiner 215 may receive such data and compute a reliability rating for the identified participants based on the received data. Alternatively, order determiner 215 may receive reliability ratings in the participant reliability data 225.

A participant with a high reliability rating may have a low probability of failing or timing out during a transaction (e.g., 0.0001% chance of failure), while a participant with a low reliability rating may have a higher probability of failing or timing out during a transaction (e.g., 1% chance of failure). For example, if a participant runs on a machine that frequently crashes, or that frequently suffers from network interruptions, then order determiner 215 may assign that participant a low reliability rating. In one embodiment, order determiner assigns a reliability rating of between 1 and 100 for each participant, where a reliability rating of about 1-25 is considered a low liability rating and a reliability rating of 75-100 is considered a high liability rating. Order determiner 215 may then order the participants based on their computed reliability ratings.

In one embodiment, order determiner 215 orders participants with low reliability ratings before participants with high reliability ratings. This enables a participant with a low reliability rating to perform its operations for the distributed transaction before other participants. Therefore, the other participants may not need to perform their operations for the distributed transaction if the low reliability participant fails.

In one embodiment, order determiner 215 determines the participant order for a distributed transaction based on received participant dependency data 225. Some or all participants may include dependency reporters that detect and report service calls between resource managers. The service invocations or other data indicative of dependencies between resource managers may be reported to transaction manager 205, which may determine dependencies between participants based on this data. Alternatively, the dependency reporters may report the service calls to a dependency mapper, which may determine dependencies between resource managers (and their managed resources). Order determiner 215 may query the dependency mapper for dependency data 230 on the participants of a distributed transaction.

In one embodiment, order determiner 215 orders participants such that participants that are depended on by other participants are ordered before those other participants. Therefore, if a participant on which other participants depend fails, then those other participants that depend on the failed participant will not be invoked.

In one embodiment, order determiner 215 determines the participant order for a distributed transaction based on received historical prepare phase response data. When a participant responds to a prepare message from a coordinator, the participant may respond with a commit response (indicating that the participant will commit to the transaction), an abort or rollback response (indicating that the participant will not commit to the transaction and that all other participants should roll back to a state that they had prior to the transaction), or a read only response (indicating that the participant's state will not change due to the transaction). If the participant responds with a read only response, then that participant may not participate further in the distributed transaction. The historical prepare phase response data 235 may indicate a frequency with which particular participants respond with a commit response, with an abort response and with a read only response. Those participants that have the highest frequency of replying with read only responses and/or abort responses may be ordered before participants that have a high frequency of responding with a commit response.

In one embodiment, the historical prepare phase response data 235 indicates a transaction category. Transaction categories may include, for example, credit card transactions, banking transactions, booking transactions, and so on. Different commit, abort and/or read only response frequencies of participants may be determined for each transaction category. Accordingly, category specific response frequencies may be used for ordering participants in a distributed transaction.

In one embodiment, order determiner 215 includes multiple participant ordering rules 245. Each ordering rule 245 may order the participants for a distributed transaction based on a different type of received data (e.g., based on participant reliability data 225, participant dependency data 230, historical prepare phase response data 235, etc.). Additionally, some ordering rules 245 may be preset ordering rules that specify particular ordering for participants. For example, an administrator may generate an ordering rule that specifies that a particular resource manager should always be ordered last when it participates in distributed transactions.

Order determiner 215 may apply a single ordering rule or multiple ordering rules to determine participant order for a particular transaction. If multiple ordering rules are used, order determiner 215 may determine an order in which to apply the participant ordering rules 245. For example, order determiner 215 may first apply an ordering rule that orders participants based on participant reliability and then apply another ordering rule that orders participants based on participant dependencies. In such an embodiment, in many instances the participant dependency based ordering will override the participant reliability ordering.

In another embodiment, order determiner determines an order based on a weighted combination of multiple ordering rules 245. Each ordering rule may assign a score or value to each participant, where the score/value identifies an ordering priority for that participant. Order determiner 215 may then weight the scores/values generated based on each ordering rule and combine the weighted scores. The participants may then be ordered based on the combined weighted scores.

Once a participant order has been determined, messaging module 220 sends out messages to participants based on the participant order. Messaging module 220 preferably sends out the messages serially. Therefore, messaging module 220 waits to receive a response from a current participant to which a message has been sent before sending the message to a next participant in the participant order.

Most transactions coordinated by transaction manager 205 will be two-phase commit distributed transactions. For a two-phase commit distributed transaction, order determiner 215 may use the same participant order for the prepare phase and for the commit phase. Alternatively, order determiner 215 may determine a first participant order for a prepare phase of the two-phase commit distributed transaction and a second participant order for a commit phase of the two-phase commit distributed transaction. For example, some participants may be labeled as high importance participants. Such high importance participants may be invoked last in the prepare phase and first in the commit phase to minimize an amount of time these participants maintain locks on resources for the transaction. The ordering rules 245 used to determine the first participant order may differ from the ordering rules 245 used to determine the first participant order. In one embodiment, no specific participant order is used for the prepare phase, but a determined or specified participant order is used for the commit phase.

In one embodiment, transaction manager 205 includes a prepare phase monitor 222. Prepare phase monitor 222 monitors participant behavior during the prepare phase of a two-phase commit distributed transaction. Monitored behavior may include response time, number of times a prepare message had to be resent to a participant, whether participants failed during the prepare phase, and so on. Order determiner 215 may determine the second participant order for the commit phase of the two-phase commit distributed transaction based on an ordering rule that orders participants using monitored participant behavior during the prepare phase.

Figure 3:
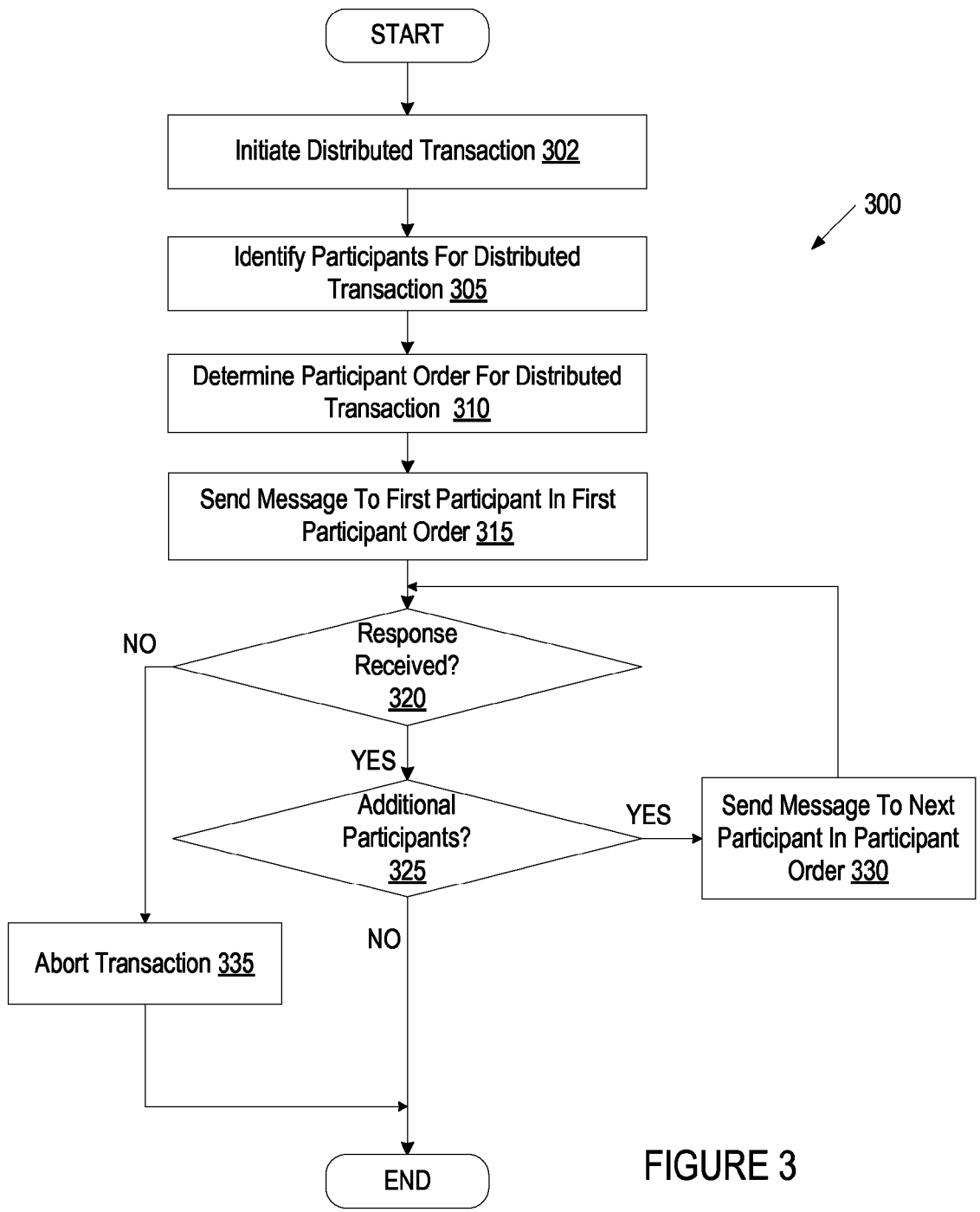
FIG. 3 illustrates a flow diagram of one embodiment for a method of ordering participant invocation for a distributed transaction.

FIG. 3 illustrates a flow diagram of one embodiment for a method 300 of ordering participant invocation for a distributed transaction. The method is performed by processing logic that comprises hardware (e.g., circuitry, dedicated logic, programmable logic, microcode, etc.), software (such as instructions run on a processing device), or a combination thereof. In one embodiment, method 300 is performed by a transaction manager running on a computing device (e.g., first transaction manager 120 of FIG. 1).

Referring to FIG. 3, at block 302 of method 300, processing logic initiates a distributed transaction. Processing logic may initiate the distributed transaction in response to a request from a transaction application for a distributed transaction. At block 305, processing logic identifies participants for the distributed transaction. The participants may be dictated to the processing logic by the transaction application. Alternatively, or in addition, processing logic may determine resource managers to include as participants for the distributed transaction.

At block 310, processing logic determines a participant order for the distributed transaction. Processing logic may determine the participant order based on an ordering rule or set of ordering rules. Examples of ordering rules include rules that order participants based on participant dependencies, based on participant reliability, and based on historical prepare phase response data.

At block 315, processing logic sends a message to a first participant in the participant order. Processing logic then waits for a response from the first participant. At block 320, processing logic determines whether a response has been received from the first participant. If a response is received from the first participant, the method continues to block 325. If no response is received, the method continues to block 335.

At block 335, processing logic may abort the transaction. Alternatively, processing logic may resend the message to the first participant and again wait for a response.

At block 325, processing logic determines whether there are any additional participants of the distributed transaction to send the message to. If there are additional participants to send the message to, the method continues to block 330. Otherwise, the method ends.

At block 330, processing logic sends the message to a next participant in the participant order. The method then returns to block 330, and processing logic waits for for a response from the next participant.

Figure 4:
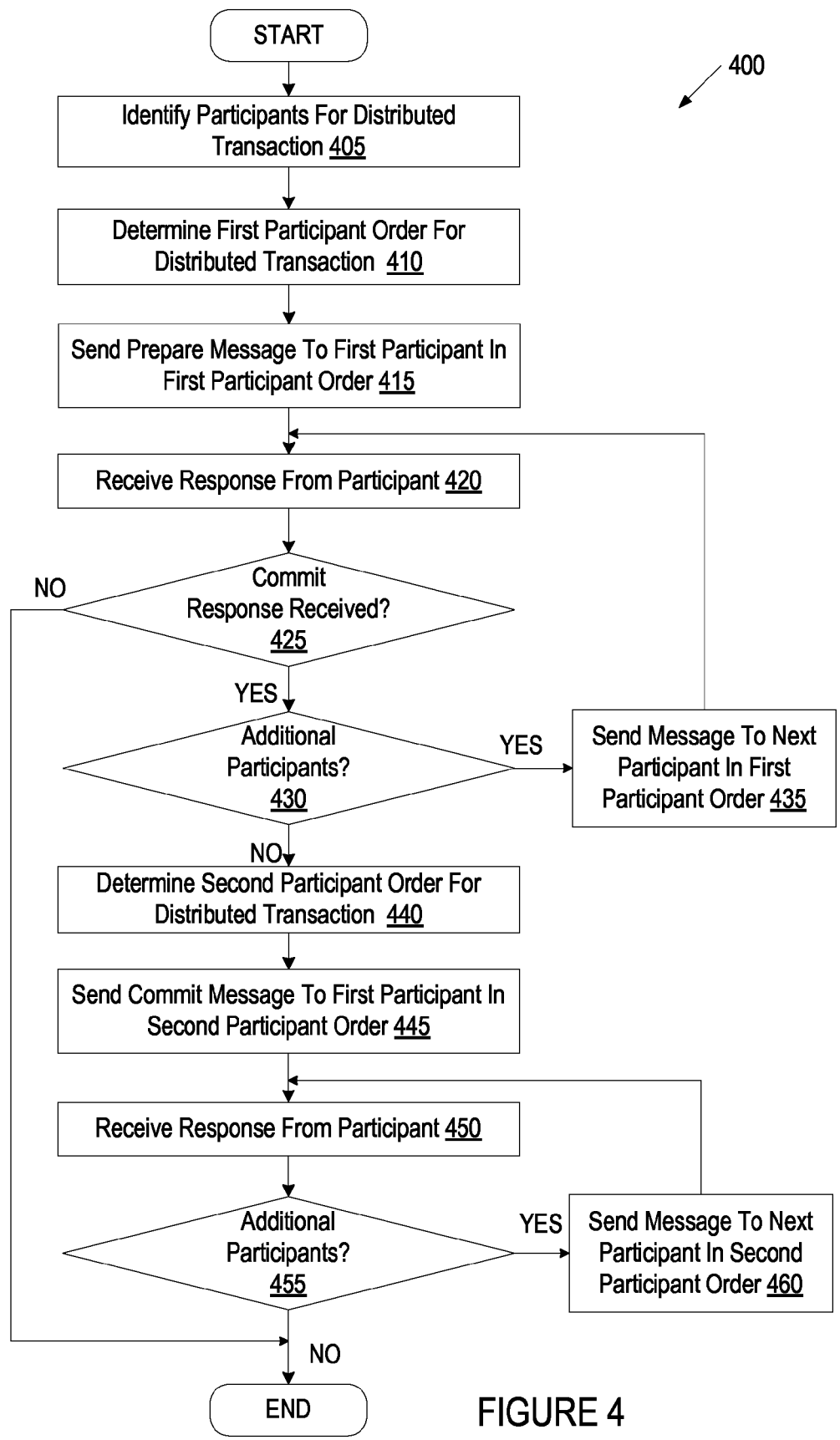
FIG. 4 illustrates a flow diagram of one embodiment for a method of ordering participant invocation for a two-phase commit distributed transaction.

FIG. 4 illustrates a flow diagram of one embodiment for a method 400 of ordering participant invocation for a two-phase commit distributed transaction. The method is performed by processing logic that comprises hardware (e.g., circuitry, dedicated logic, programmable logic, microcode, etc.), software (such as instructions run on a processing device), or a combination thereof. In one embodiment, method 400 is performed by a transaction manager running on a computing device (e.g., first transaction manager 120 of FIG. 1).

Referring to FIG. 4, after initiating a distributed transaction, at block 405 of method 400 processing logic identifies participants for the distributed transaction. At block 410, processing logic determines a first participant order for the distributed transaction. Processing logic may determine the first participant order based on an ordering rule or set of ordering rules. Examples of ordering rules include rules that order participants based on participant dependencies, based on participant reliability, based on historical prepare phase response data based on participant importance, and so on.

At block 415, processing logic sends a prepare message to a first participant in the first participant order. Processing logic then waits for a commit or abort response from the first participant. At block 420, processing logic receives a response from the first participant. At block 425, processing logic determines whether the received response is a commit response or an abort response. If the received response is a commit response, the method continues to block 430. If the received response is an abort response, the transaction is terminated and the method ends.

At block 430, processing logic determines whether there are any additional participants of the distributed transaction to send the prepare message to. If there are additional participants to send the prepare message to, the method continues to block 435. Otherwise, the method continues to block 440.

At block 435, processing logic sends the prepare message to a next participant in the participant order. The method then returns to block 420, and processing logic receives a response message from the next participant.

At block 440, processing logic determines a second participant order for the distributed transaction. The second participant order may be determined using the same ordering rule or rules used to generate the first participant order, or may be determined using a different ordering rule or set of ordering rules. In one embodiment, processing logic determines the second order based on monitoring data collected from the participants during the prepare phase of the distributed transaction.

At block 445, processing logic sends a commit message to a first participant in the second participant order. At block 450, processing logic receives a response from the participant. The received response may indicate that the participant has successfully committed to the transaction. At block 455, processing logic determines whether there are any additional participants to send the commit message to. If there are additional participants, the method continues to block 460. Otherwise, the method ends.

At block 460, processing logic sends the commit message to a next participant in the second participant order. The method then returns to block 450, and processing logic waits for a response from the next participant.

Figure 5:
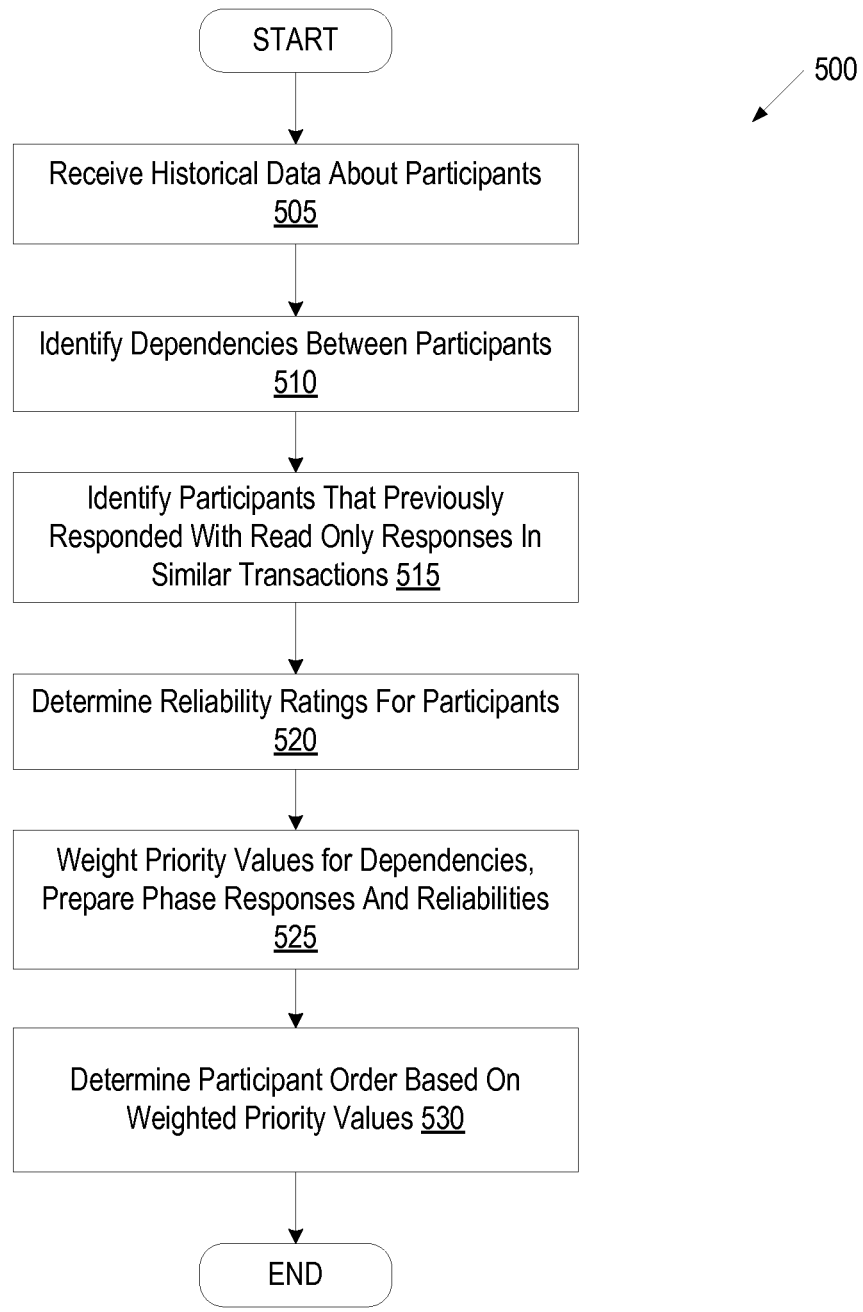
FIG. 5 illustrates a flow diagram of one embodiment for a method of determining a transaction participant invocation order.

FIG. 5 illustrates a flow diagram of one embodiment for a method 500 of determining a transaction participant invocation order. The method is performed by processing logic that comprises hardware (e.g., circuitry, dedicated logic, programmable logic, microcode, etc.), software (such as instructions run on a processing device), or a combination thereof. In one embodiment, method 500 is performed by a transaction manager running on a computing device (e.g., first transaction manager 120 of FIG. 1). In one embodiment, method 500 is performed at block 310 of method 300 and/or at blocks 410 and/or 440 of method 400. Computed results may include participant importance values, reliability values, etc.

Referring to FIG. 5, at block 505 of method 500 processing logic receives historical data about participants. The historical data may be raw historical data or may be computed results based on historical data. Received historical data may include historical participant data on participant reliability, participant dependency, participant prepare phase responses, and so on.

At block 510, processing logic identifies dependencies between participants based on received participant dependency data included in the historical data. At block 515, processing logic identifies participants that previously responded to a prepare message with read only responses in similar transactions to a current transaction. Similar transactions may be transactions initiated by a same transaction manager, transactions requested by a same transaction application and/or transactions having a same transaction category. Processing logic may also identify participants that previously responded with an abort response in a similar transaction.

At block 520, processing logic determines reliability ratings for the participants. The reliability ratings may be included in the received historical data. Alternatively, processing logic may calculate the reliability ratings based on the received historical data.

At block 525, processing logic weights the reliability ratings, participant importance values, prepare phase response values, dependency values, etc. For example, dependency ratings may be weighted more heavily than reliability ratings. Accordingly, dependencies may have a stronger influence on final ordering of participants. At block 530, processing logic determines the participant order based on the weighted priority values. The method then ends.

Figure 6:
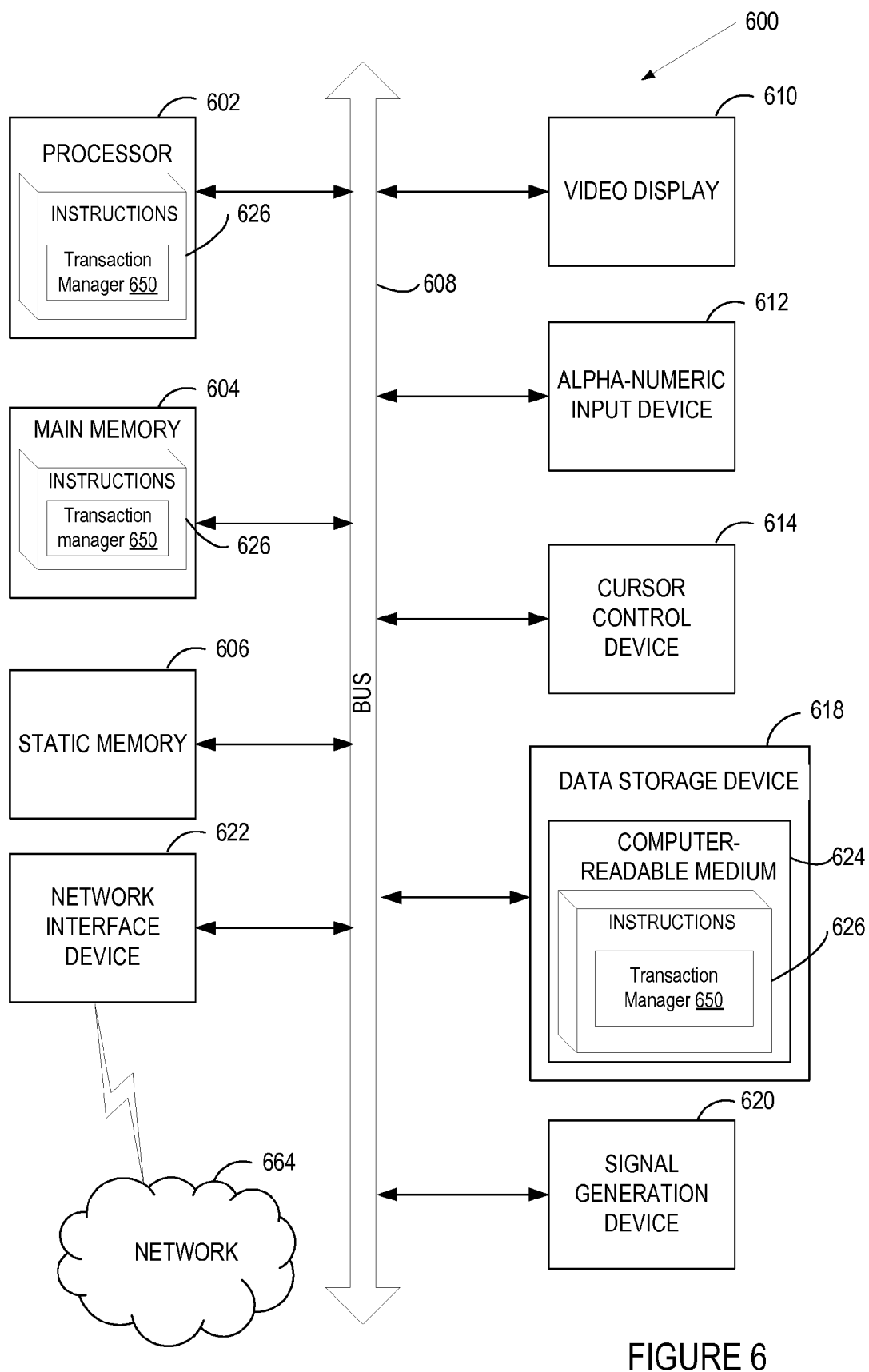
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute processing logic (instructions 626) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting computer-readable storage media.

The computer-readable storage medium 624 may also be used to store a transaction manager 650 and/or resource manager (e.g., the first transaction manager 120, first resource manager 115, second transaction manager 145 etc. of FIG. 1A), and/or a software library containing methods that call transaction managers or resource managers. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying a plurality of participants for a two-phased commit distributed transaction by a processing device of a computing device running a coordinator, wherein the coordinator coordinates the two-phase commit distributed transaction;
   wherein during a first phase the coordinator asks the plurality of participants whether they are able to commit to the distributed transaction and in a second phase, the coordinator determines whether the distributed transaction should be completed or rolled back;
   determining, by the processing device of the computing device running the coordinator, a first participant order for the plurality of participants to apply during a prepare phase of the two-phase commit distributed transaction in view of one or more ordering rules that order invoking participants in view of participant invocation dependencies and participant reliability, wherein determining the first participant order in view of the participant invocation dependencies and the participant reliability further comprises:
   determining reliability ratings for the plurality of participants;
   weighting priority values for the at least one of the participant invocation dependencies; and
   ordering the plurality of participants in view of the weighted priority values, wherein ordering comprises prioritizing the participants having low reliability ratings before the participants having high reliability ratings in the first participant order,
   wherein a reliability rating corresponds to a probability of failing or timing out during the distributed transaction;
   sending a message for the distributed transaction to a first participant in the determined first participant order;

waiting until a response is received from the first participant before sending the message to a second participant in the determined first participant order; and determining additional participants based on the received response from the first participant of the distributed transaction to which to send the message, and when there are additional participants to which to send a prepare message, a next participant in the first participant order.

2. The method of claim 1, wherein determining the first participant order comprises:
identifying an invocation dependency between at least the first participant of the plurality of participants and the second participant of the plurality of participants that depends on the first participant; and
ordering the first participant before the second participant in the first participant order in view of the invocation dependency.

3. The method of claim 1, wherein determining the first participant order comprises:
identifying one or more read only participants; and
ordering the one or more read only participants before other participants of the plurality of participants in the first participant order.

4. The method of claim 1, wherein determining the first participant order is further in view of at least one of a participant resource locking time or participant historical data from previous transactions.

5. The method of claim 1, further comprising:
determining a second participant order using the one or more ordering rules for the plurality of participants to apply during a commit phase of the two-phase commit distributed transaction.

6. The method of claim 5, wherein the second participant order is different from the first participant order.

7. The method of claim 5, wherein the second participant order is determined in view of measurements obtained during the prepare phase.

8. A non-transitory computer readable storage medium including instructions that, when executed by a processing device, cause the processing device to:
identify a plurality of participants for a two-phase commit distributed transaction by a coordinator running on the processing device, wherein the coordinator coordinates the two-phase commit distributed transaction;
wherein during a first phase the coordinator asks the plurality of participants whether they are able to commit to the distributed transaction and in a second phase, the coordinator determines whether the distributed transaction should be completed or rolled back;
determine, by the processing device running the coordinator, a first participant order for the plurality of participants to apply during a prepare phase of the two-phase commit distributed transaction in view of one or more ordering rules that order invoking participants in view of participant invocation dependencies and participant reliability, wherein to determine the first participant order in view of the at least one of participant invocation dependencies and participant reliability, the processing device is further to:
determine reliability ratings for the plurality of participants;
weight priority values for the at least one of the participant invocation dependencies; and
order participants in view of the weighted priority values, wherein to order, the processing device is to prioritize participants having low reliability ratings before participants having high reliability ratings in the first participant order, wherein a reliability rating corresponds to a probability of failing or timing out during the distributed transaction;
send a message for the distributed transaction to a first participant in the determined first participant order;
wait until a response is received from the first participant before sending the message to a second participant in the determined first participant order; and
determine additional participants based on received response from the first participant of the distributed transaction to which to send the message, and when there are additional participants to which to send a prepare message, a next participant in the first participant order.

9. The non-transitory computer readable storage medium of claim 8, wherein to determine the first participant order, the processing device is to:
identify an invocation dependency between at least the first participant of the plurality of participants and the second participant of the plurality of participants that depends on the first participant; and
order the first participant before the second participant in the first participant order in view of the invocation dependency.

10. The non-transitory computer readable storage medium of claim 8, wherein to determine the first participant order, the processing device is to:
identify one or more read only participants; and
order the one or more read only participants before other participants of the plurality of participants in the first participant order.

11. The non-transitory computer readable storage medium of claim 8, wherein the processing device is to determine the first participant order further in view of at least one of a participant resource locking time or participant historical data from previous transactions.

12. The non-transitory computer readable storage medium of claim 8, wherein the processing device is further to: determine a second participant order using the one or more ordering rules for the plurality of participants to apply during a commit phase of the two-phase commit distributed transaction.

13. The non-transitory computer readable storage medium of claim 12, wherein the second participant order is different from the first participant order.

14. The non-transitory computer readable storage medium of claim 12, wherein the second participant order is determined in view of measurements obtained during the prepare phase.

15. A computing device comprising:
a memory to store instructions for a coordinator that coordinates distributed transactions; and
a processing device, coupled to the memory, wherein the processing device is to execute the coordinator to:
identify a plurality of participants for a two-phase commit distributed transaction;
during a first phase the coordinator asks the plurality of participants whether they are able to commit to the distributed transaction and in a second phase, the coordinator determines whether the distributed transaction should be completed or rolled back;
determine a first participant order for the plurality of participants to apply during a prepare phase of the two-phase commit distributed transaction in view of one or more ordering rules that order invoking participants in view of participant invocation dependencies and participant reliability, wherein to determine the first participant order in view of the at least one of participant invocation dependencies and participant reliability, the coordinator is further to:

determine reliability ratings for the plurality of participants;

weight priority values for the at least one of the participant invocation dependencies; and order participants in view of the weighted priority values, wherein to order, the coordinator is to prioritize participants having low reliability ratings before participants having high reliability ratings in the first participant order, wherein a reliability rating corresponds to a probability of failing or timing out during the distributed transaction;

send a message for the distributed transaction to a first participant in the determined first participant order;

wait until a response is received from the first participant before sending the message to a second participant in the determined first participant order, and determine additional participants based on received response from the first participant of the distributed transaction to which to send the message, and when there are additional participants to which to send a prepare message, a next participant in the first participant order.

16. The computing device of claim 15, wherein to determine the first participant order, the processing device is to:

identify an invocation dependency between at least the first participant of the plurality of participants and the second participant of the plurality of participants that depends on the first participant; and order the first participant before the second participant in the first participant order in view of the invocation dependency.

17. The computing device of claim 15, wherein to determine the first participant order, the processing device is to:

identify one or more read only participants; and order the one or more read only participants before other participants of the plurality of participants in the first participant order.

18. The computing device of claim 15, wherein the processing device is to determine the first participant order further in view of at least one of a participant resource locking time or participant historical data from previous transactions.

19. The computing device of claim 15, wherein the coordinator is further to:

determine a second participant order using the one or more ordering rules for the plurality of participants to apply during a commit phase of the two-phase commit distributed transaction.

20. The computing device of claim 19, wherein the second participant order is determined in view of measurements obtained during the prepare phase.

* * * * *